US010921250B2

(12) United States Patent
Parsons et al.

(10) Patent No.: US 10,921,250 B2
(45) Date of Patent: Feb. 16, 2021

(54) DUST ACCUMULATION MONITOR

(71) Applicant: BAKER ENGINEERING & RISK CONSULTANTS, INC., San Antonio, TX (US)

(72) Inventors: Philip James Parsons, San Antonio, TX (US); Benjamin Stover, Cypress, TX (US); Yujie Hou, Cypress, TX (US)

(73) Assignee: BAKER ENGINEERING & RISK CONSULTANTS, INC., Antonio, TX (US)

( * ) Notice: Subject to any disclaimer, the term of this patent is extended or adjusted under 35 U.S.C. 154(b) by 0 days.

(21) Appl. No.: 16/122,272

(22) Filed: Sep. 5, 2018

(65) Prior Publication Data

US 2019/0072487 A1  Mar. 7, 2019

Related U.S. Application Data

(60) Provisional application No. 62/554,357, filed on Sep. 5, 2017.

(51) Int. Cl.
*G01N 21/59* (2006.01)
*G08B 21/18* (2006.01)
*G01N 21/94* (2006.01)

(52) U.S. Cl.
CPC ............ *G01N 21/59* (2013.01); *G01N 21/94* (2013.01); *G08B 21/18* (2013.01)

(58) Field of Classification Search
CPC ................. G01N 21/59; G08B 21/18
(Continued)

(56) References Cited

U.S. PATENT DOCUMENTS 4,867,561 A * 9/1989 Fujii ................... B60H 1/00785
356/239.8
2004/0022071 A1* 2/2004 Cheng ..................... F21S 11/00
362/557

(Continued)

FOREIGN PATENT DOCUMENTS

CN     204177708 U  *  2/2015
JP     2014002593 A  *  1/2014
JP     2014100430 A  *  6/2014

OTHER PUBLICATIONS

Machine translation JP 2014002593 A (Year: 2014).*
Machine translation JP 2014100430 A (Year: 2014).*

*Primary Examiner* — Kam Wan Ma
(74) *Attorney, Agent, or Firm* — McDermott Will & Emery LLP

(57) ABSTRACT

Dust accumulation monitors are provided to autonomously monitor dust accumulations. The dust accumulation monitors include a casing having a translucent portion, a light sensor configured to output a sensing signal based on sensed light penetrating through the translucent portion, a controller coupled to the light sensor to receive the sensing signal and configured to output a dust alert signal based on the received sensing signal, and a communication interface coupled to the controller and configured to output an alert based on the dust alert signal output by the controller. A dust accumulation monitoring system includes a plurality of dust accumulation monitors, and a central monitor communicatively connected to each of the plurality of dust accumulation monitors and configured to receive dust sensing signals from each of the plurality of dust accumulation monitors. The dust accumulation monitors may communicate through wired or wireless links with the central monitor.

10 Claims, 11 Drawing Sheets

(58) Field of Classification Search
USPC .......................................................... 340/540
See application file for complete search history.

(56) References Cited

U.S. PATENT DOCUMENTS

| | | | |
|---|---|---|---|
| 2008/0100826 A1* | 5/2008 | Sharpe ................... | G01N 21/59 356/51 |
| 2010/0155584 A1* | 6/2010 | Mack .................... | B60S 1/0837 250/227.25 |
| 2012/0011676 A1* | 1/2012 | Jung ....................... | A47L 9/106 15/301 |
| 2013/0061659 A1* | 3/2013 | Ajay .................... | G01N 1/2205 73/28.04 |
| 2013/0192341 A1* | 8/2013 | Ajay ...................... | B03O 3/366 73/28.04 |
| 2013/0305481 A1* | 11/2013 | Jung ....................... | A47L 9/106 15/301 |
| 2017/0282220 A1* | 10/2017 | Moffa .................... | B08B 3/102 |

* cited by examiner

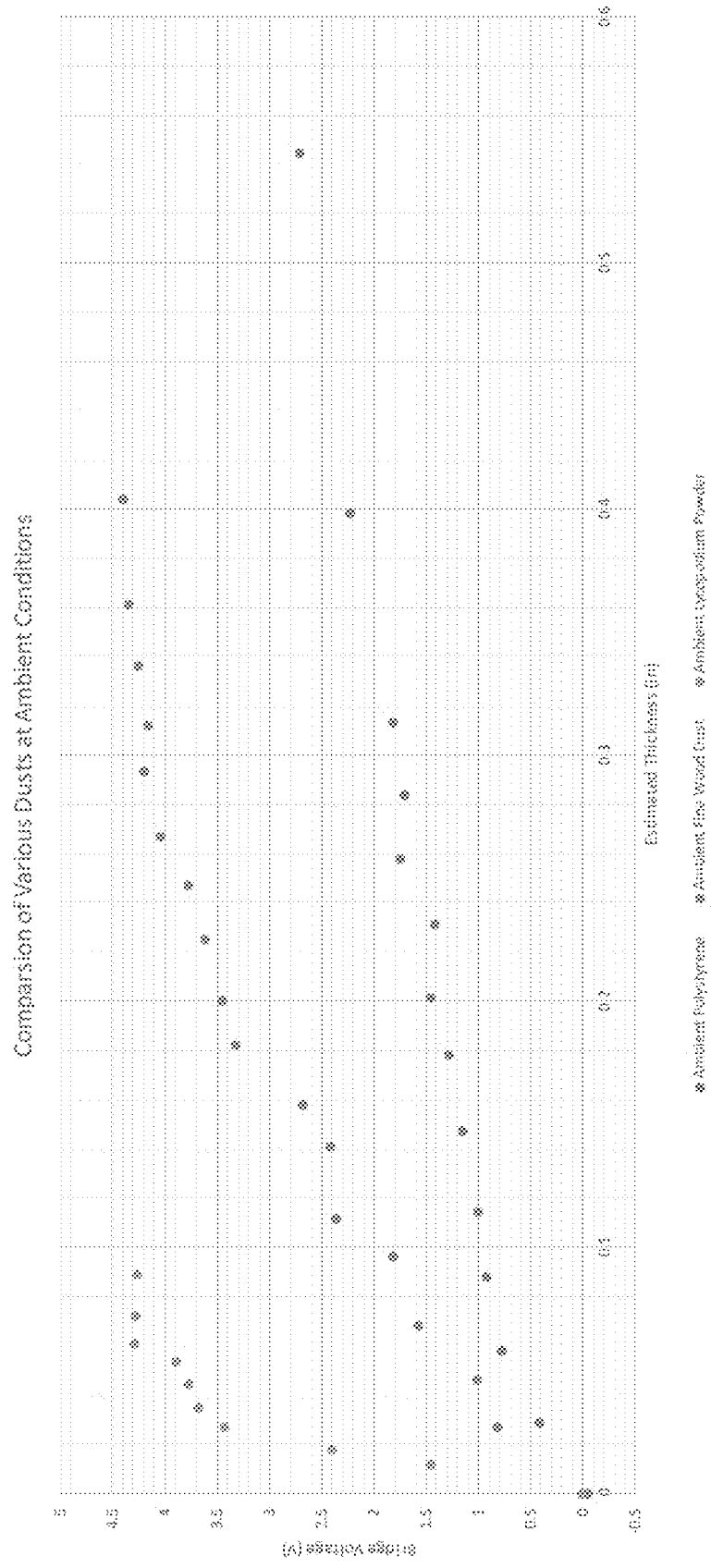

__DUST ACCUMULATION MONITOR__

CROSS-REFERENCE TO RELATED APPLICATION

This application claims the benefit of U.S. Provisional Application No. 62/554,357, filed Sep. 5, 2017, the disclosure of which is incorporated by reference herein in its entirety.

TECHNICAL FIELD

The present subject matter relates to techniques and equipment to monitor dust accumulation.

BACKGROUND

Accumulations of dust, including flammable and/or combustible dust, can trigger dust explosions and other dangerous conditions. Accumulations of flammable dust commonly occur in process plants and other industrial environments, and monitoring of dust accumulations for prompt cleaning is therefore needed to maintain a safe work environment and prevent damage to facilities and machinery.

Dust explosions may be classified as being either primary or secondary in nature. Primary dust explosions typically occur within individual pieces of equipment inside process plants or similar enclosures (baghouse, cyclone, grinder, etc.), and are generally controlled by pressure relief venting through purpose-built ducting to the atmosphere. Secondary dust explosions are the result of dust accumulations within the facility (e.g., outside of equipment) which occur when the dust is disturbed, suspended, and ignited by the primary explosion, resulting in a more dangerous uncontrolled explosion inside the workplace. Facilities damage and fatalities from dust explosions are normally the result of secondary dust explosions. Therefore, control of fugitive dust emissions and housekeeping outside of equipment are a major focus of flammable or combustible dust related standards and are the key to reducing the potential for a catastrophic event.

Current National Fire Protection Association (NFPA) standards place significant emphasis on the need to maintain housekeeping of dust accumulations outside of equipment to below some threshold thickness to minimize the associated risk. A common point of reference for invoking a potential hazard is when a dust accumulation is sufficiently thick to prevent the underlying surface color from being distinguished. This puts a significant demand on facility staff and resources in order to periodically visually inspect elevated surfaces of a process facility, particularly if the process building volume is large, or building quantity is high (e.g., if the process facility includes multiple buildings). Inspections may involve the use of man-lifts, cranes, and a team of devoted personnel resulting in significant cost burden.

A need therefore exists for a system capable of efficiently and automatically monitoring dust accumulations in a facility in order to enable maintaining of safe working conditions and efficient deployment of housekeeping resources.

SUMMARY

The teachings herein alleviate one or more of the above noted problems by providing a system capable of monitoring dust accumulations.

In accordance with the principles of the disclosure, a dust accumulation monitor includes a casing, a light sensor, a controller, and a communication interface. The casing has a translucent portion. The light sensor is configured to output a sensing signal based on sensed light penetrating through the translucent portion. The controller is coupled to the light sensor to receive the sensing signal and is configured to output a dust alert signal based on the received sensing signal. The communication interface is coupled to the controller and is configured to output an alert based on the dust alert signal output by the controller.

The upper surface of the casing may be transparent.

The dust accumulation monitor may further include a light source coupled to the controller and configured to output light under control of the controller. The controller may be configured to sample the sensing signal received from the light sensor while the light source is activated to output light.

The light sensor and the light source may be disposed on opposite sides of the translucent portion of the casing.

The light sensor may be disposed inside the casing and the light source may be disposed outside of the casing.

Alternatively, the light sensor may be disposed outside the casing and the light source may be disposed inside of the casing.

The dust accumulation monitor may further include a power source and a timer circuit configured to selectively provide power from the power source to the controller on a periodic basis.

The communication interface may include at least one of a sound or light emitter operative to emit an audible or visual alert based on the dust alert signal output by the controller.

The communication interface may include a communication transceiver configured to transmit a dust alert signal to a central monitor based on the dust alert signal output by the controller.

The communication transceiver may include a wireless communication transceiver configured to wireless transmit the dust alert signal to the central monitor.

The communication transceiver may include a wired communication transceiver configured to transmit the dust alert signal to the central monitor.

The controller may store an adjustable reference level, and may be configured to output a dust alert signal based on a comparison of the received sending signal with the adjustable reference level.

The light sensor may include a Wheatstone bridge circuit.

In accordance with further principles of the disclosure, a dust accumulation monitoring system may include a plurality of dust accumulation monitors and a central monitor. The plurality of dust accumulation monitors each include a light sensor configured to output a dust sensing signal based on sensed light penetrating through a translucent portion of the respective dust accumulation monitor. The central monitor is communicatively connected to each of the plurality of dust accumulation monitors and is configured to receive dust sensing signals from each of the plurality of dust accumulation monitors.

The central monitor may be configured to selectively activate a machinery interlock based on the dust sensing signals received from each of the plurality of dust accumulation monitors.

The central monitor may be configured to selectively activate an alert system based on the dust sensing signals received from each of the plurality of dust accumulation monitors.

The central monitor and the plurality of dust accumulation monitors may be configured for wireless communication with each other.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 8, 9, and 10 are plots showing experimental measurement results obtained using a dust accumulation sensor such as those shown in FIGS. 1A-1C.

DETAILED DESCRIPTION

Figure 1A:
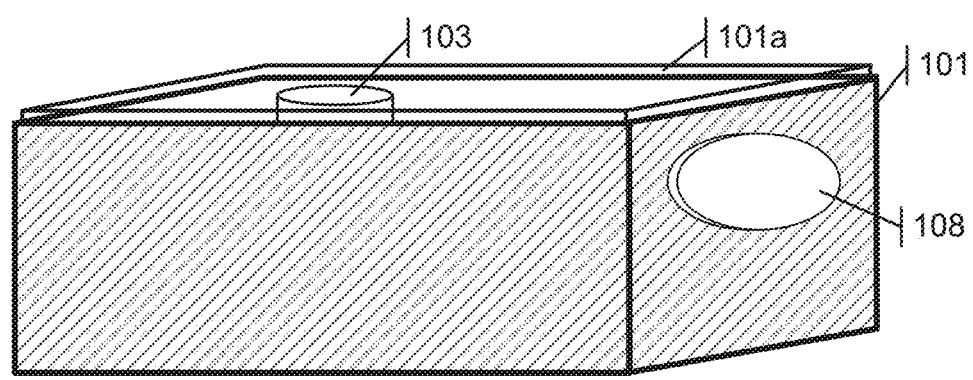
FIG. 1A shows an illustrative embodiment of an exemplary dust accumulation monitor.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods described herein relate to the monitoring of dust accumulations. Such systems and methods may be used, for example, in monitoring of accumulations of dust including flammable or combustible particles and triggering of alerts in response to dust accumulations exceeding an adjustable threshold.

In order to monitor dust accumulations, some embodiments of dust accumulation monitors as described herein utilize a photocell resistors, such as photocell resistors used in dusk-to-dawn light sensors. Embodiments of the dust accumulation monitor are configured to provide a tunable sensitivity of the photo cell. The dust accumulation monitor includes a casing, for example an electrical enclosure, with a transparent cover. The photocell faces the transparent cover, and is used to detect when dust accumulation on the transparent cover is sufficient to preclude light from passing through the transparent cover and reach the photocell. When the light detected by the photocell drops below a threshold, the dust accumulation monitor determines that the hazard criteria has been achieved and activates an alert system.

The dust accumulation monitor provides an adjustable or tunable sensitivity to thereby cause activation of the alert system at an adjustable dust accumulation threshold or dust accumulation thickness. The ability to change the sensitivity allows the device to detect various thicknesses of dust to a maximum limiting thickness value. In addition, the sensitivity feature allows the sensor to be located in very bright or dark locations, with the sensitivity calibrated appropriately to reduce potential false positive alarms. The adjustable sensitivity also enables the sensitivity to be adjusted depending on the type of dust being detected, since a higher density dust may impede light transmission at a lower thickness than lower density dusts.

In some chosen device locations (e.g., rafters), the ambient light may be very low, thus reducing the range of the sensor's capability. In other locations, ambient light may be highly variable thereby introducing uncertainty in the relationship between dust accumulation and light sensed by the photocell. In such cases, a devoted light source (e.g., an external light source) may be integrated in the dust accumulation monitor and used to provide sufficient sensitivity range for the sensor to minimize false positive alarms.

The photocell of the dust accumulation monitor provides an output signal, also referred to as a sensing signal, that qualifies the dust accumulation thickness at a particular location at which the dust accumulation monitor is located. In some examples, the dust accumulation monitor may additionally or alternatively quantify the dust accumulation. In general, however, the monitor is intended to generate and emit a signal when a dust accumulation sufficient to inhibit light transmission has been deposited on the monitor, which may correspond to a dust accumulation sufficient to obscure an underlying surface color. Based on the generated/emitted alert signal, an operator can then inspect the location to confirm the presence of dust accumulation and determine what action(s) to take (e.g., clean dust, reset device, or the like). The monitor thereby provides a method for remotely monitoring the dust accumulation rate in order to optimize cleaning frequency without having to continuously inspect the location. Remote and independent operation of the monitor relieves the burden of utilizing resources to inspect (often unnecessarily) elevated surfaces to determine dust accumulation rates.

Reference is now made in detail to the examples illustrated in the accompanying drawings and discussed below.

FIG. 1A shows an illustrative embodiment of a dust accumulation monitor 100 that may be used for monitoring dust accumulations. The dust accumulation monitor 100 has a casing 101, such as a solid box, within which components of the dust accumulation monitor 100 are mounted. The casing 101 includes a translucent portion 101a which may be translucent or transparent. In general, the dust accumulation monitor 100 is designed to be oriented such that the translucent portion 101a faces upwards with respect to gravity. Additionally, a light sensor 103 of the dust accumulation monitor 100 is disposed so as to sense light passing through the translucent portion 101a. As such, the light sensor 103 is generally disposed such that a light sensing or light receiving portion thereof faces (e.g., is oriented towards) the translucent portion 101a, as shown in FIG. 1A.

Figure 1B:
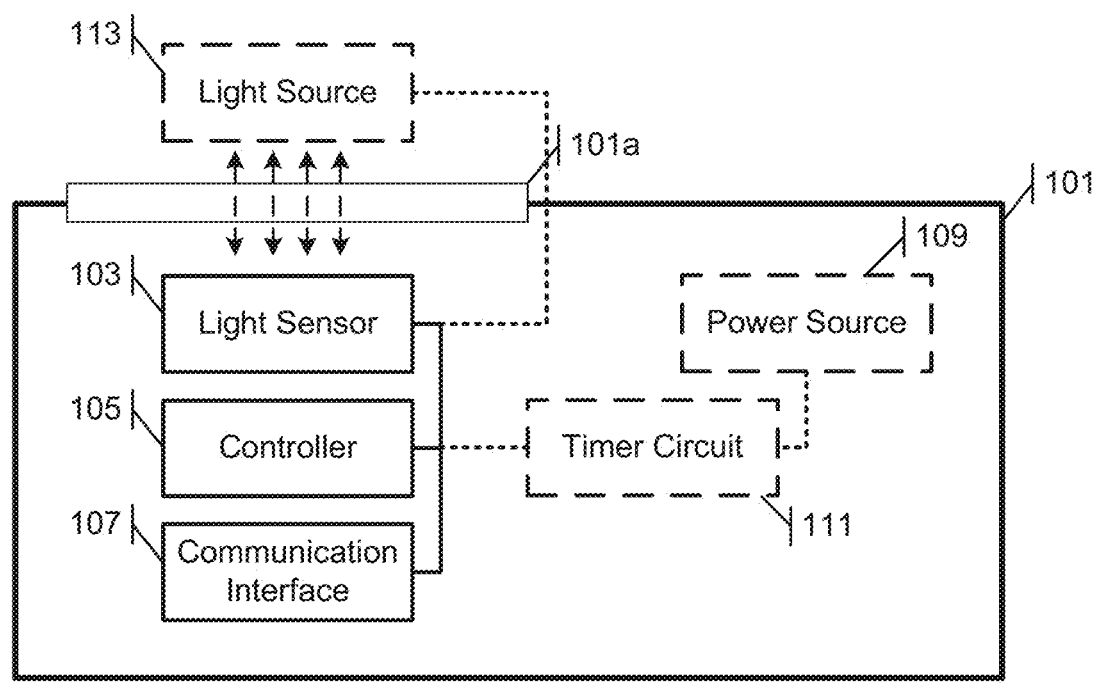
FIGS. 1B and 1C are functional block diagrams of exemplary dust accumulation monitors.

FIG. 1B shows a functional block diagram of an example of the dust accumulation monitor 100. The dust accumulation monitor 100 includes the light sensor 103 such as a photocell disposed within the casing 101 and disposed so as to sense light passing through the translucent portion 101a of the casing 101. Additionally, the light sensor 103 is communicatively connected to a controller 105, and is configured to output a sensing signal to the controller 105 based on sensing light penetrating through the translucent portion 101a. The controller 105 is communicatively coupled to the light sensor 103 to receive the sensing signal, and is configured to output a dust alert signal based on the received sensing signal. For example, the controller 105 may process the received sensing signal in order to estimate a current thickness of dust accumulation on the translucent portion 101a, and may output the dust alert signal when the estimated thickness exceeds a threshold value (e.g., or when the sensed light falls below a light threshold value).

The controller 105 may be a microcontroller that can be used, in some embodiments, to compare a voltage sensing signal received from the light sensor 103 to a programmed reference threshold, and to trigger an alert based on the result of the comparison. The controller 105 may be an open-source microcontroller, may operate at low voltage (e.g., 6 volts), may include both analog and digital input pins, and may operate with low power consumption (e.g., 19 mA of current consumption, or as low as 12 mA).

The dust accumulation monitor 100 further includes a communication interface 107 communicatively coupled to the controller 105 and configured to output an alert based on the dust alert signal output by the controller 105. For example, the communication interface 107 may take the form of a strobe light 108 or other visual indicator configured to output a visual alert, a speaker or other auditory output means configured to output an auditory alert, or a wired or wireless transceiver configured to transmit a signal to a central monitor remote from the dust accumulation monitor 100.

Figure 1C:
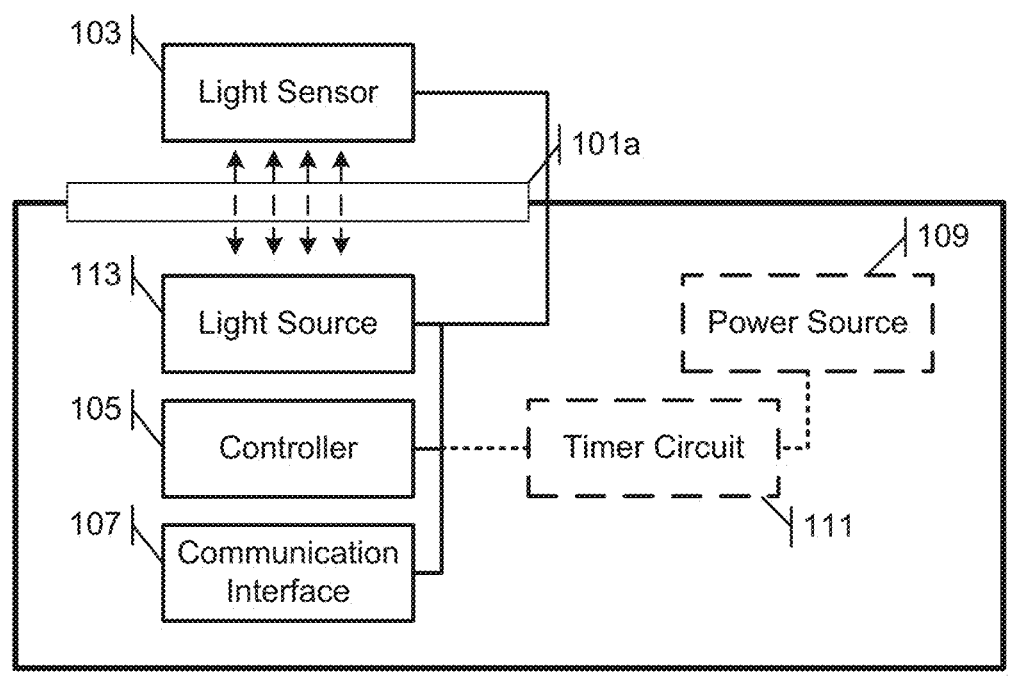

In some embodiments, the dust accumulation monitor 100 further includes a light source 113, which may be internal or external. The use of the light source 113 reduces the effect of variable ambient light variations on the dust accumulation monitor 100, and enables operation of the monitor 100 in dark locations. The light source 113 is disposed on an opposite side of the translucent portion 101a relative to the light sensor 103. As such, the light source 113 may be disposed outside of the casing 101 in an embodiment in which the light sensor 103 is mounted inside of the casing 101 (see, e.g., FIG. 1B) or the light source 113 may be mounted inside of the casing 101 in an embodiment of the dust accumulation monitor 100a in which the light sensor 103 is disposed outside of the casing 101 (see, e.g., FIG. 1C). The light source 113 is communicatively coupled to the controller 105 and is configured to output light under control of the controller 105. For example, the controller 105 may activate the light source 113 immediately prior to and during a dust accumulation reading so as to sample the sensing signal received from the light sensor 103 while the light source 113 is activated and outputting light. The light source 113 may include one or more light emitting diodes (LEDs) or other light emitters.

The dust accumulation monitor 100 can further include a power source 109 for providing electrical power to components of the dust accumulation monitor 100 for its operation, including to the light sensor 103, the controller 105, the communication interface 107, and the optional light source 113. An optional timer circuit 111 may be used to reduce power consumption of the dust accumulation monitor 100, as discussed in more detail below.

The light sensor 103 can include one or more photo sensors, photocells, or other sensors that allow for the detection of light. Photo sensors or photocells are small, inexpensive, and low-power sensors having an extended useful life, and may include cadmium-sulfide (CdS) cells, light-dependent resistors (LDR), and photoresistors, among others. In operation, photo sensors or photocells may function as resistors having a resistance value that changes depending on an amount or intensity of light that impinges or shines onto a sensing face of the photocell.

Figure 2A:
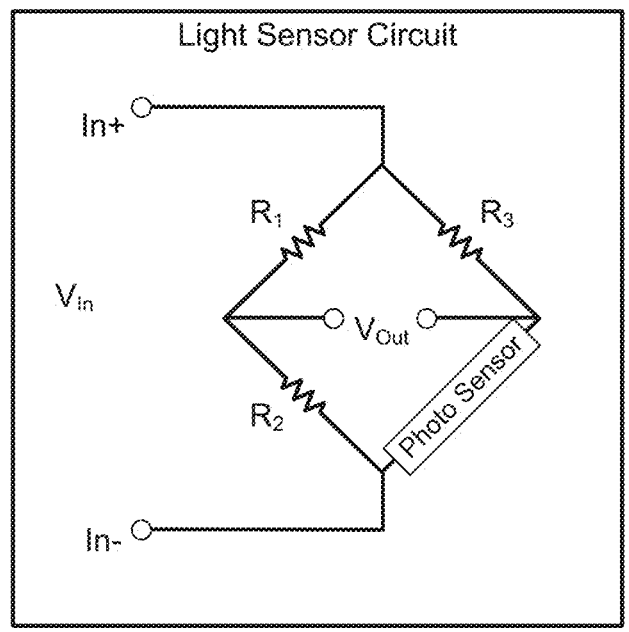
FIGS. 2A and 2B are schematics of an exemplary light sensor circuit and an exemplary relay circuit as may be used in the dust accumulation monitors shown in FIGS. 1A-1C.

FIG. 2A shows an illustrative light sensor circuit that may be used as part of the light sensor 103. As shown in the figure, the light sensor circuit can include a Wheatstone bridge circuit including a photo sensor and three resistors (or, more generally, impedance elements). The light sensor circuit can include two power terminals In+ and In− at which operating power $V_{In}$ is applied, a first series interconnection of resistors $R_1$ and $R_2$ coupled between the power terminals In+ and In−, and a second series interconnection of a resistor $R_3$ and the photo sensor coupled between the power terminals In+ and In−.

In the light sensor circuit of FIG. 2A, the output signal $V_{Out}$ is given by:

$$V_{Out} = \left( \frac{R_{PS}}{R_3 + R_{PS}} - \frac{R_2}{R_1 + R_2} \right) * V_{In},$$

where $R_{PS}$ is the resistance of the photo sensor.

In operation, the output voltage $V_{Out}$ varies as the resistance $R_{PS}$ of the photo sensor changes, and thereby varies as the amount of light impinging on the light sensor 103 varies. In particular, $V_{Out}$ has a relatively low value when a lot of light impinges on the light sensor 103 (e.g., when no dust is present) such that the light sensor 103 has low resistance, and $V_{Out}$ increases to a relatively high value as light impinging on the light sensor 103 decreases (e.g., as light transmission decreases with increased dust thickness) such that the light sensor 103 has high resistance.

The controller 105 may selectively provide the operating power $V_{In}$ to the light sensor circuit at the terminals In+ and In−. For example, an output pin of the controller 105 may be coupled to the terminal In+, and may selectively provide operating power to the terminal In+, while the terminal In− may be connected to a ground node or ground potential.

Figure 2B:
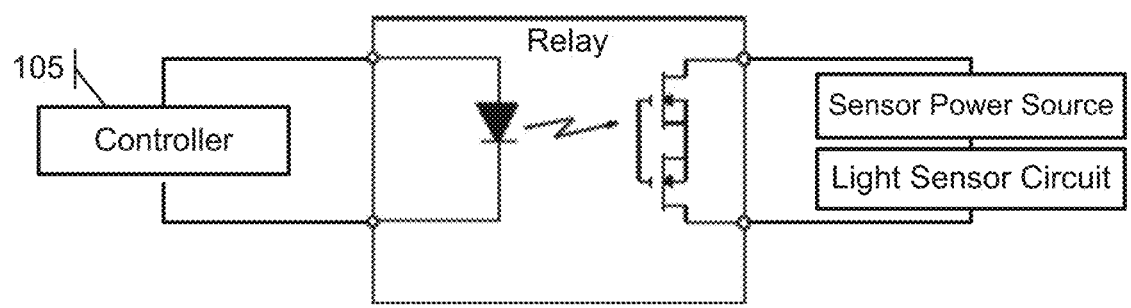

Alternatively, a relay circuit such as that shown in FIG. 2B can be used to selectively provide the operating power $V_{In}$ to the light sensor circuit under control of the controller 105. For example, the relay circuit may be used in situations in which the light sensor circuit is provided with higher power (e.g., higher current) than can be output by the controller 105. As shown in FIG. 2B, the controller 105 controls a relay such as a photo-relay to cause the relay to selectively close. When the relay is open, no operating power is provided to the light sensor circuit; however, when the relay is closed under control of the controller 105, the sensor power source provides the operating power to the light sensor circuit for operation of the light sensor circuit. The sensor power source may correspond to the same power source 109 used in operation of the dust accumulation monitor 100, or may be a power source having a higher current or voltage than that provided by the power source 109.

While the light sensor circuit receives operating power, the light sensor circuit produces a sensing signal (e.g., $V_{Out}$) across its output terminals. The sensing signal $V_{Out}$ varies based on the amount or intensity of light impingent on the photo sensor, and can thereby vary based on the amount of sensed light penetrating through the translucent portion 101a of the dust accumulation monitor 100. In general, the output terminal(s) $V_{Out}$ of the light sensor circuit are communicatively coupled to input terminals of the controller 105 to enable the controller 105 to receive the sensing signal output by the light sensor 103 or light sensor circuit.

The controller 105 performs processing based on the sensing signal of the light sensor 103 to estimate a dust accumulation thickness on the translucent portion 101a of the dust accumulation monitor 100. In operation, the controller 105 may sample the sensing signal received from the light sensor 103, for example during a period of time when the light source 103 is activated and outputting light. The controller 105 may compare the sampled sensing signal value to a predetermined threshold value and output a dust alert signal based on the comparison.

In one example in which the sensing signal value increases as less light impinges on the light sensor 103, the controller 105 determines whether the sampled sensing signal value exceeds the predetermined threshold value and triggers output of the dust alert signal when the sampled sensing signal value exceeds the predetermined threshold value. In another example in which the sensing signal value decreases as less light impinges on the light sensor 103 (e.g., if $V_{Out}$ has a reverse polarity relative to the one example), the controller 105 determines whether the sampled sensing signal value falls below the predetermined threshold value and triggers output of the dust alert signal when the sampled sensing signal value falls below the predetermined threshold value.

Based on the processing, the controller 105 outputs a dust alert signal to the communication interface 107 to cause the communication interface 107 to issue an audible alert, a visual alert, and/or a communication to a central monitor.

Figure 3A:
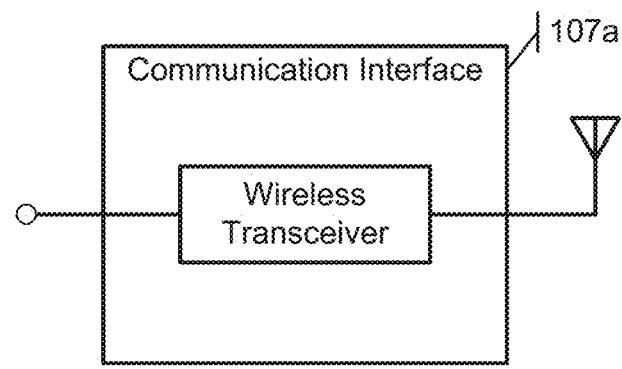
FIGS. 3A and 3B are functional block diagrams of exemplary communication interfaces as may be used in the dust accumulation monitors shown in FIGS. 1A-1C.
Figure 3B:
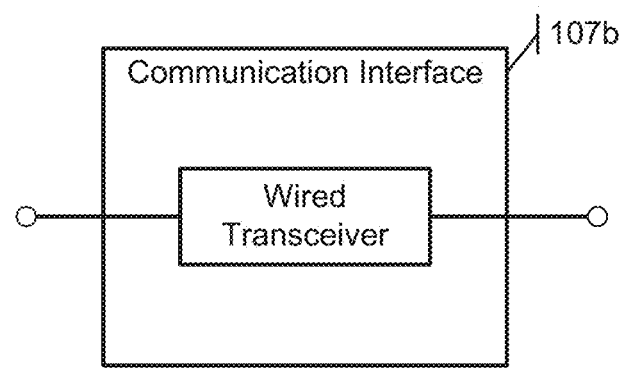

FIGS. 3A and 3B show simplified block diagrams of two illustrative communication interfaces 107. The communication interface 107 can include a sound or light emitter, such as a strobe or other light, a speaker or alarm, or other device operative to output an audible and/or visual alert. In this way, the communication interface 107 can emit an audible or visual alert based on the dust alert signal output by the controller 105. In general, a high efficiency strobe light can be used to enable the strobe to continue operation for four days from a single battery charge. Additionally or alternatively, the communication interface can include one or more transceivers, such as a first communication interface 107a that includes a wireless transceiver and an antenna or a second communication interface 107b that includes a wired transceiver. The first and second communication interfaces 107a and 107b can transmit the dust alert signal to a central monitor based on the dust alert signal output by the controller 105. The first and second communication interfaces 107a and 107b can additionally transmit to the central monitor other information including a low battery signal, a periodic status report, or the like, under the control of the controller 105.

In some embodiments, the transceiver-based communication interfaces (e.g., 107a, 107b) are configured for two-way communication. The communication interfaces 107a can then transmit the dust alert signal to the central monitor, and can additionally receive control commands from the central monitor and forward the commands to the controller 105. For example, the central monitor can transmit a command to perform one or more dust accumulation measurements via the communication interfaces 107a, 107b, and the controller 105 may then perform the measurements in response to receiving the command.

Figure 4A:
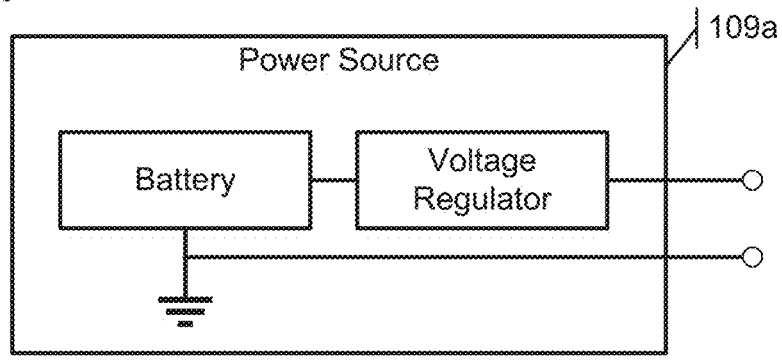
FIGS. 4A, 4B, and 4C are functional block diagrams of exemplary power sources and a voltage regulator circuit as may be used in the dust accumulation monitors shown in FIGS. 1A-1C.
Figure 4B:
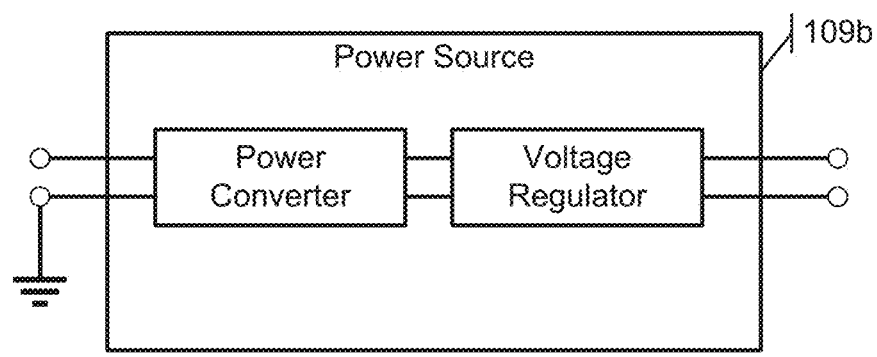
Figure 4C:
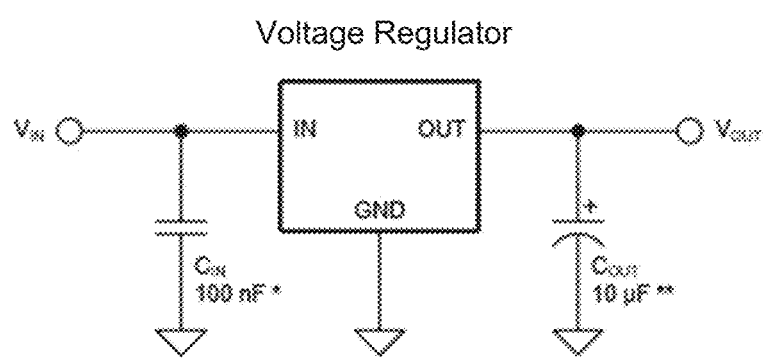

FIGS. 4A and 4B show simplified block diagrams of two illustrative power sources 109. As shown, the power source 109 can include one or both of a battery-based power source 109a and a power-line power source 109b. The battery-based power source 109a includes a battery (e.g., a lithium or alkaline battery) and an optional power regulator or power converter in line with the battery output to provide regulated power at a desired power level for operation of the dust accumulation monitor 100. The power-line power source 109b can include a power converter and a voltage regulator to convert line voltage (received at an input) to the desired power level for operation of the dust accumulation monitor 100. Note that a hybrid power source (not shown) may include elements of both the battery-based power source 109a and the power-line power source 109b to enable operation of the dust accumulation monitor 100 on line voltage while providing for a battery-backup as needed. FIG. 4C shows an illustrative voltage regulator circuit that may be used in the power source 109. Note that in some embodiments, all components of the dust accumulation monitor 100 may operate at a same voltage level output by the power source 109. In other embodiments, the power source 109 may be configured to output two different power levels, for example to include a lower power level for powering the controller 105 and communication interface 107 and a higher power level for powering the light sensor 103 and light source 113 via relays (see, e.g., FIG. 2B).

In order to lower the power expenditure of the dust accumulation monitor 100, the dust accumulation monitor 100 can include the timer circuit 111 configured to selectively provide power from the power source 109 to the controller 105 and other components of the dust accumulation monitor 100. For example, the timer circuit 111 can provide power on a periodic basis, so as to reduce the amount of power consumed by the components of the monitor 100 during standby operation. Standby operation may correspond to a lower power operating mode in which the dust accumulation monitor 100 operates when no dust accumulation measurements are being taken, and during which the controller 105, light sensor 103, and other components can be powered off to reduce energy expenditure. In one implementation, a battery-powered dust accumulation monitor 100 can operate independently for up to twelve months without requiring charging or battery replacement. In other embodiments battery-powered dust accumulation monitor 100 can operate independently for longer periods of time (e.g., maintain operation for over one year, or multiple years, on a single battery charge) through selective cycling of sensors and components as discussed below in relation to FIG. 5.

Figure 5:
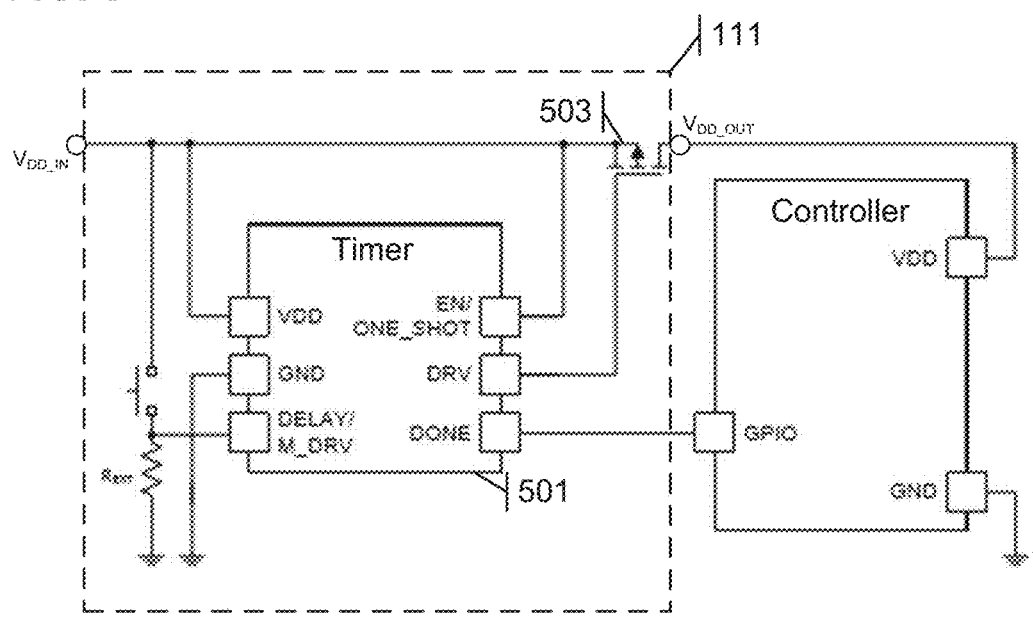
FIG. 5 is functional block diagram of an exemplary timer circuit as may be used in the dust accumulation monitors shown in FIGS. 1A-1C.

FIG. 5 shows a simplified block diagram of an illustrative timer circuit 111 receiving an input power supply voltage $V_{DD\_IN}$ (e.g., from the power source 109) and selectively providing the input power supply voltage to the output $V_{DD\_OUT}$ (e.g., to the controller 105 and other components of the dust accumulation monitor 100). The timer circuit 111 includes a timer 501 that is powered by the input power supply voltage and that selectively closes a switch 503 (e.g., a MOSFET switch) to provide the input power to the output $V_{DD\_OUT}$.

The timer 501 is operative to close the switch 503 on a periodic basis. The period can be adjusted according to the value of the resistor $R_{EXT}$, and can for example be adjusted in a range of milliseconds to one day (e.g., in the range of 30 minutes to 12 hours in some embodiments). Every time the period has elapsed, the timer 501 closes the switch 503 in order to provide the input power supply voltage $V_{DD\_IN}$ to the output $V_{DD\_OUT}$. In general, the timer 501 continues to provide the input power to the output $V_{DD\_OUT}$ until receiving a power-off signal from the controller 105 at its DONE input. Alternatively or additionally, the timer 501 can continue to provide the input power to the output $V_{DD\_OUT}$ for a predetermined amount of time, and may automatically open the switch 503 once the predetermined amount of time has elapsed.

Figure 6:
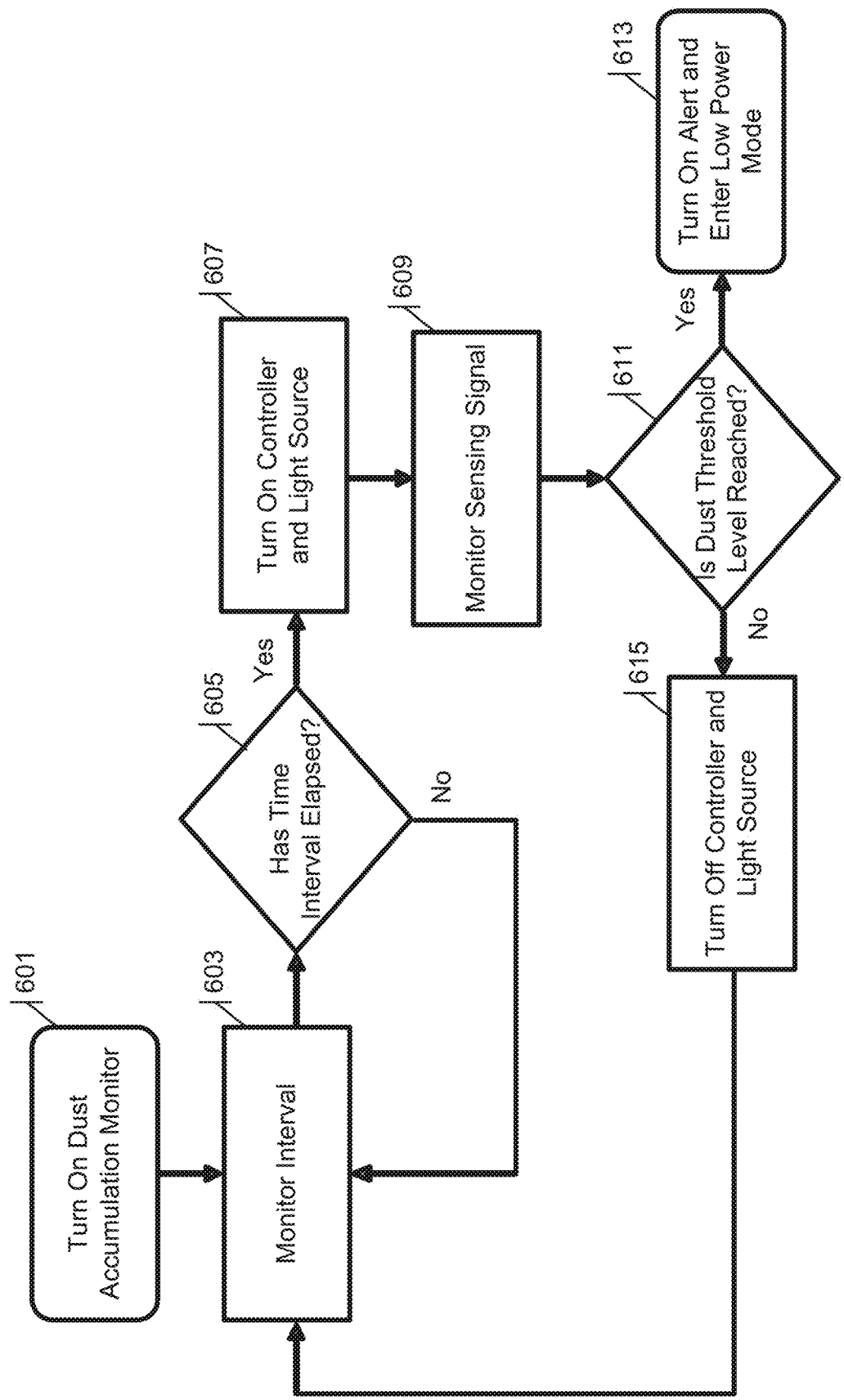
FIG. 6 is a simplified flow diagram outlining exemplary operation of a dust accumulation monitor such as those shown in FIGS. 1A-1C.

FIG. 6 is a simplified flow diagram outlining operation of the dust accumulation monitor 100 according to some embodiments. The operation begins at step 601 with the dust accumulation monitor being activated or turned on. The activation may result in the timer circuit 111 being powered on and beginning operation.

In step 603, the timer circuit 111 monitors the time interval or period for periodically closing switch 503 and providing input power to other components of the dust accumulation monitor 100. The timer circuit 111 monitors the time interval to determine whether the time interval has elapsed (step 605), and remains in the monitoring status until the time interval has elapsed. Once the time interval has elapsed, operation proceeds in step 607 with the timer circuit 111 providing operating power to the controller 105, the optional light source 113, and other components of the dust accumulation monitor including the light sensor 103 and the communication interface 107 so as to turn on those components.

While the controller 105 and optional light source 113 are powered on, the controller 105 proceeds to monitor its input terminals for the sensing signal output by the light sensor 103 in step 609. For example, the controller 105 may monitor an analog or digital signal at its input, and may sample the signal and process the signal sample to determine whether a dust alert signal should be output (step 611). In this regard, the controller 105 may compare an analog sensing signal from the light sensor 103 to a predetermined threshold level, and may thereby determine that the predetermined dust thickness has been reached if the sensing signal exceeds the threshold. The controller 105 may digitize the sensing signal from the light sensor 103 into a digital sensing signal (e.g., using an analog-to-digital converter) and may compare the digital sensing signal to a predetermined threshold level, and may thereby determine that the predetermined dust thickness has been reached if the digital sensing signal exceeds the threshold.

If the controller 105 determines that the threshold dust level is reached (step 611, Yes), the controller 105 proceeds to generate a dust alert signal to the communication interface 107 to issue an auditory or visual alert and/or to notify the central monitor (step 613). The controller 105 then causes the dust accumulation monitor 100 to enter a low power mode. Alternatively, if the controller 105 determines that the threshold dust level is not reached (step 611, No), the controller 105 causes the timer 501 to turn off power to the controller 105, optional light source 113, and other components of the dust accumulation monitor 100 and to resume monitoring of the time interval (step 603).

In accordance with the various embodiments outlined herein, the dust accumulation monitor 100 can function as a standalone device monitoring a local accumulation of dust. In this regard, each dust accumulation monitor 100 is self-contained and provides a local audible and/or visual alarm when an accumulation threshold or other condition is satisfied. In general, such dust accumulation monitors 100 may be self-powered devices that operate based on battery power, solar power, or the like, though such devices may also rely on line power for operation.

Figure 7:
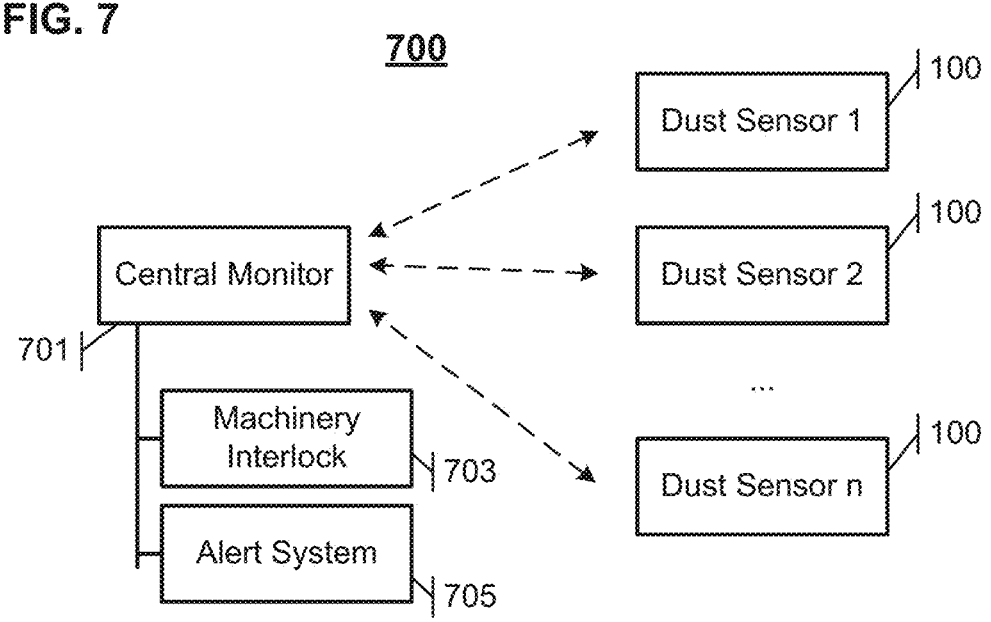
FIG. 7 is a functional block diagram of an exemplary dust accumulation monitoring system including dust accumulation monitors such as those shown in FIGS. 1A-1C.

Additionally, the dust accumulation monitor 100 can function as a networked device that forms part of a network of devices monitoring accumulations of dust at multiple locations (e.g., throughout a facility). In the networked embodiment, which is illustratively shown in FIG. 7, a dust monitoring system 700 can include multiple (e.g., 'n') dust accumulation monitors 100 that are each configured to send a dust alert signal to a central monitor 701 when a dust accumulation is detected. In turn, the central monitor 701 may provide audible and/or visual alarms in addition to or instead of alerts or alarms activated in the individual dust accumulation monitors 100. The central monitor 701 may additionally or alternatively provide an alert system 705 such as an alarm system configured to cause evacuation of a facility, notify emergency crews, or the like.

The central monitor 701 may also be configured to activate system interlocks or machinery interlocks 703, for example to halt operation of machinery that may trigger a dust explosion and/or that may produce additional dust. Machinery operation may be halted until the dust accumulation condition is rectified, for example by removing the dust accumulation and/or initiating a reset of the central monitor 701 and dust accumulation monitors 100. In this approach, wireless communication capabilities may be integrated into individual dust accumulation monitors 100 to provide the ability to send remote notifications to the central monitor 701 and to relay notifications between the dust accumulation monitors 100 and the central monitor 701.

The dust monitoring system 700 and components thereof may be powered by a continuous hard-wired 12V power supply (e.g., in cases in which dust accumulation monitors 100 form a wired network with the central monitor 701 and receive power over Ethernet) or by batteries, solar cells, or other power sources.

Figure 8:
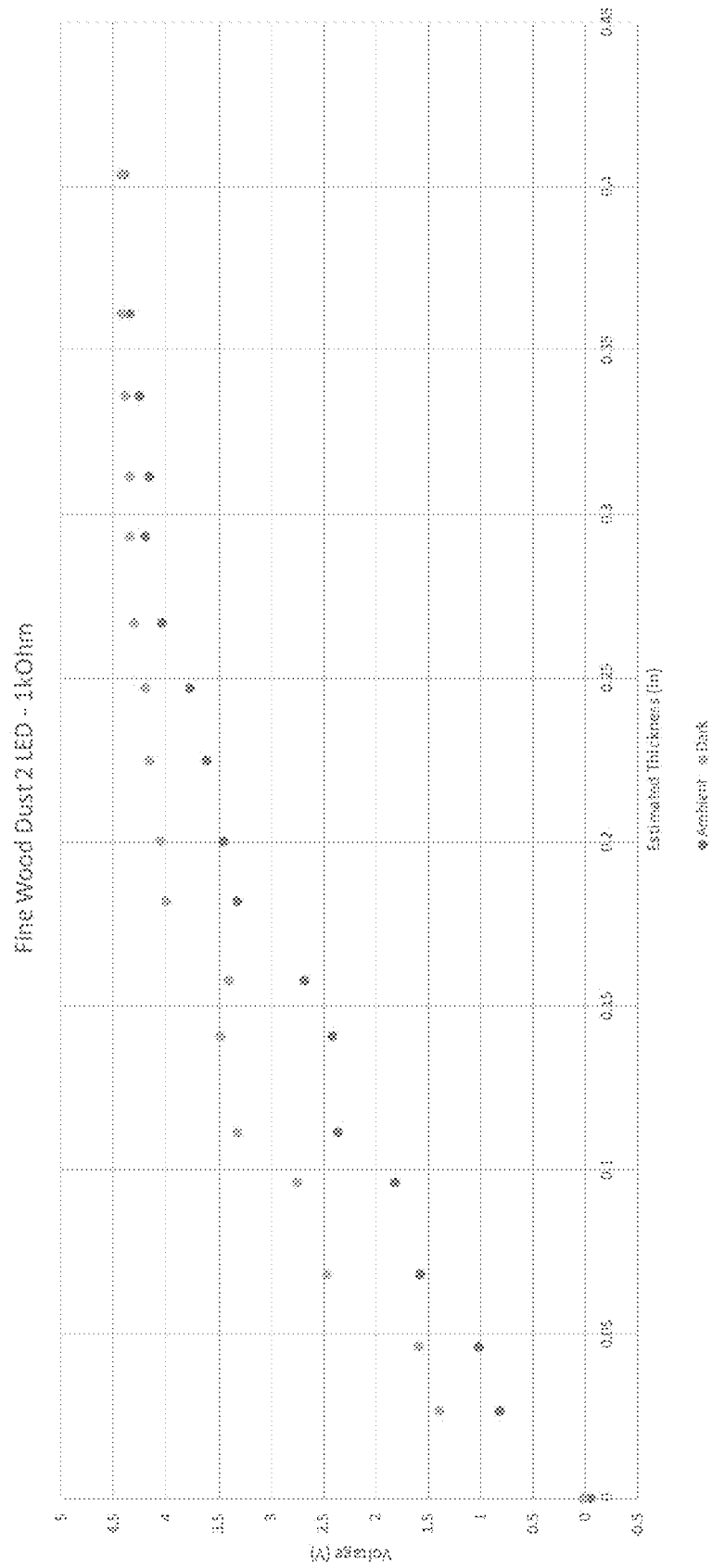
Figure 9:
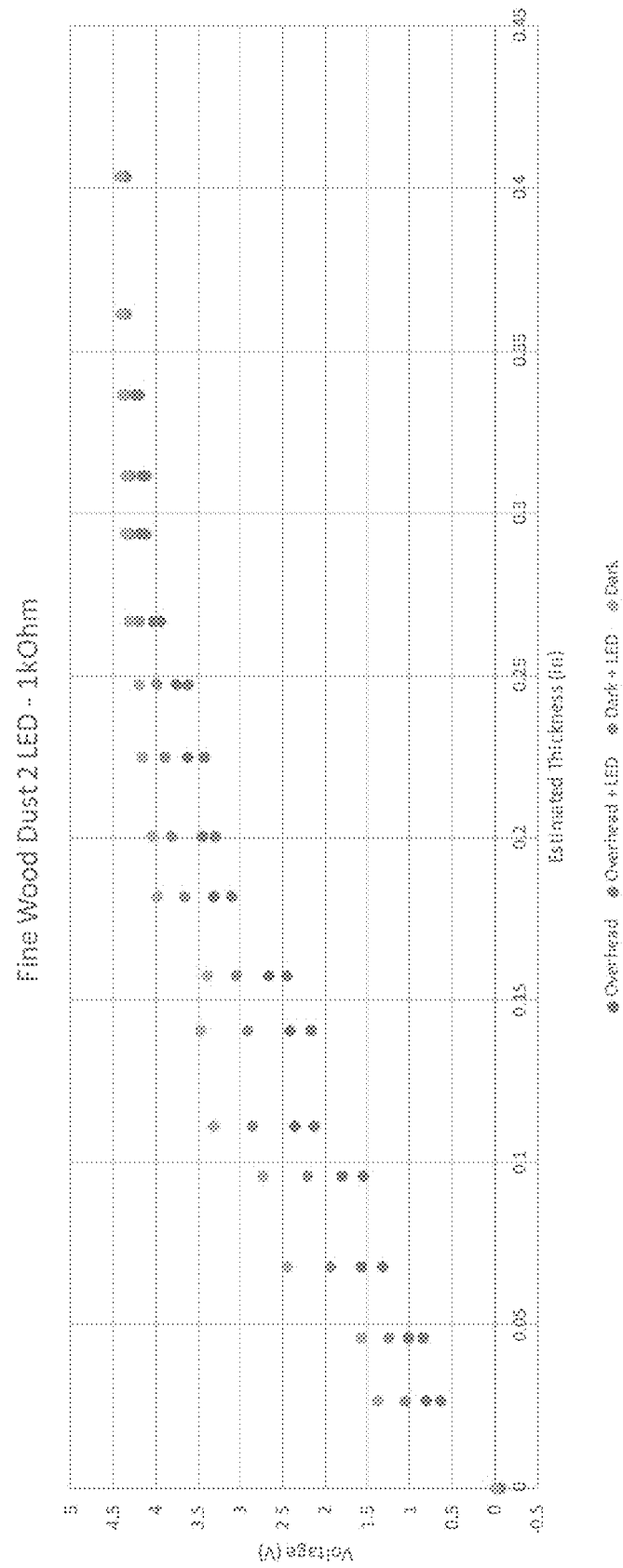

FIGS. 8-10 show plots of experimental measurements from a dust accumulation sensor 100 in accordance with the principles of the disclosure. FIG. 8 is a plot of the sensing signal voltage amplitude (y-axis) for different thicknesses of fine wood dust (range: 0 to 0.41 inch) under two ambient lighting conditions: a first condition in which ambient lighting was present, and a second 'dark' condition in which no ambient lighting was present. As shown, the sensing signal voltage amplitude increases with the fine wood dust accumulation thickness.

FIG. 9 is a plot of the sensing signal voltage amplitude (y-axis) for different thicknesses of fine wood dust (range: 0 to 0.41 inch) under various lighting conditions: a first condition in which only overhead lighting was used, a second condition in which both overhead lighting and a light source 113 were used, a third condition in which only the light source 113 was used (without ambient or overhead lighting), and a fourth condition in which no light source and no overhead lighting were used. As shown, the sensing signal voltage amplitude increases with the fine wood dust accumulation thickness.

FIG. 10 is a plot of the sensing signal voltage amplitude (y-axis) for different thicknesses of different types of dust particles, including polystyrene (thickness range 0 to 0.54 inch), fine wood dust (thickness range: 0 to 0.41 inch), and lycopodium powder (thickness range 0 to 0.9 inch). In accordance with the findings in FIG. 10, different types of dust have different characteristics, for example finer dust material (e.g., lycopodium powder) block light at thinner relative thicknesses, and translucent materials (e.g., polystyrene) block less light even at thicker relative thicknesses. In order to activate an alert, the dust accumulation monitor 100 can thus be adjusted or calibrated based on a type of dust expected to accumulate and based on a thickness at which the alert signal should be activated for the type of dust by adjusting the predetermined voltage threshold at which the alert signal is activated by the controller 105.

As noted above in relation to FIG. 10, the dust accumulation monitor (100) can be calibrated (or re-calibrated) based on different types of dust materials (e.g., to account for dust particle size, opacity, or the like). Additionally, as illustrated in FIGS. 8 and 9, the dust accumulation monitor (100) can be calibrated (or re-calibrated) based on different light levels in order to increase or decrease sensitivity. In this way, the dust accumulation monitor 100 can provide approximate thickness measurement estimates for different materials and adjust sensitivity threshold for activating the alarm/strobe according to a material type (e.g., to increase sensitivity for materials with higher flammability).

The dust accumulation monitor 100 may also activate the alert signal (e.g., activate a strobe light, or issue an alert via a transceiver) in the event of detecting an internal component failure, a low battery, or the like.

Various enclosure designs, casings, and packaging can be used based on applications (and space constraints), and for ease of manufacturing. Optionally, the design can provide wireless communication capabilities to communicate dust measurements and/or alert activation to a central monitoring station.

As shown by the above discussion, functions relating to the monitoring of dust accumulations may be implemented on controllers connected for data communication via transceivers. The controllers may include a central processor or other processing device, and memory or storage media (RAM, ROM, EEPROM, cache memory, disk drives etc.) for code and data storage. Software functionalities may involve programming, including executable code as well as associated stored data, e.g. files used for setting the threshold used for triggering the alert signal. The software code is executable by the general-purpose processor of the controller. Execution of such code by a processor enables the dust accumulation monitor 100 to implement the methodology for monitoring dust accumulation in essentially the manner performed in the implementations discussed and illustrated herein.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:
1. A dust accumulation monitor comprising:
a casing having a translucent or transparent portion, wherein the translucent or transparent portion includes a dust accumulating surface plane;
a light source and a light sensor disposed opposing sides of the translucent or transparent portion of the casing, wherein the light sensor is configured to output a sensing signal to a communication interface based on sensed light by the light source penetrating through the translucent or transparent portion of the casing; and
a controller coupled to the light sensor to receive the sensing signal and configured to output a dust alert signal based on the received sensing signal,
wherein the communication interface is coupled to the controller and configured to output an alert based on the dust alert signal output by the controller, and
wherein light perpendicularly penetrates through only one dust accumulating surface plane of the translucent or transparent portion that accumulates dust and faces upwards with respect to gravity.

2. The dust accumulation monitor of claim 1, wherein an upper surface of the casing includes the translucent or transparent portion.

3. The dust accumulation monitor of claim 1,
wherein the light source is coupled to the controller and configured to output light under control of the controller, and
wherein the controller is configured to sample the sensing signal received from the light sensor while the light source is activated to output light.

4. The dust accumulation monitor of claim 1, further comprising:
a power source; and
a timer circuit configured to selectively provide power from the power source to the controller on a periodic basis.

5. The dust accumulation monitor of claim 1, wherein the communication interface comprises at least one of a sound or light emitter operative to emit an audible or visual alert based on the dust alert signal output by the controller.

6. The dust accumulation monitor of claim 1, wherein the communication interface comprises a communication transceiver configured to transmit a dust alert signal to a central monitor based on the dust alert signal output by the controller.

7. The dust accumulation monitor of claim 6, wherein the communication transceiver comprises a wireless communication transceiver configured to wireless transmit the dust alert signal to the central monitor.

8. The dust accumulation monitor of claim 6, wherein the communication transceiver comprises a wired communication transceiver configured to transmit the dust alert signal to the central monitor.

9. The dust accumulation monitor of claim 1, wherein the controller stores an adjustable reference level, and is configured to output a dust alert signal based on a comparison of a received sending signal with the adjustable reference level.

10. The dust accumulation monitor of claim 1, wherein the light sensor comprises a Wheatstone bridge circuit.

* * * * *